Feb. 2, 1932.                C. T. HOWSON                1,843,131
                         COFFEE ROASTING MACHINE
                         Filed Dec. 14, 1928           6 Sheets-Sheet 1

Charles T. Howson, Inventor.
By Emil Neuhart
            Attorney.

Witness.
J. Oberst Jr.

Feb. 2, 1932.  C. T. HOWSON  1,843,131
COFFEE ROASTING MACHINE
Filed Dec. 14, 1928   6 Sheets-Sheet 2

Charles T. Howson, Inventor.
By Emil Neubark
Attorney.

Witness:
J. Oberst, Jr.

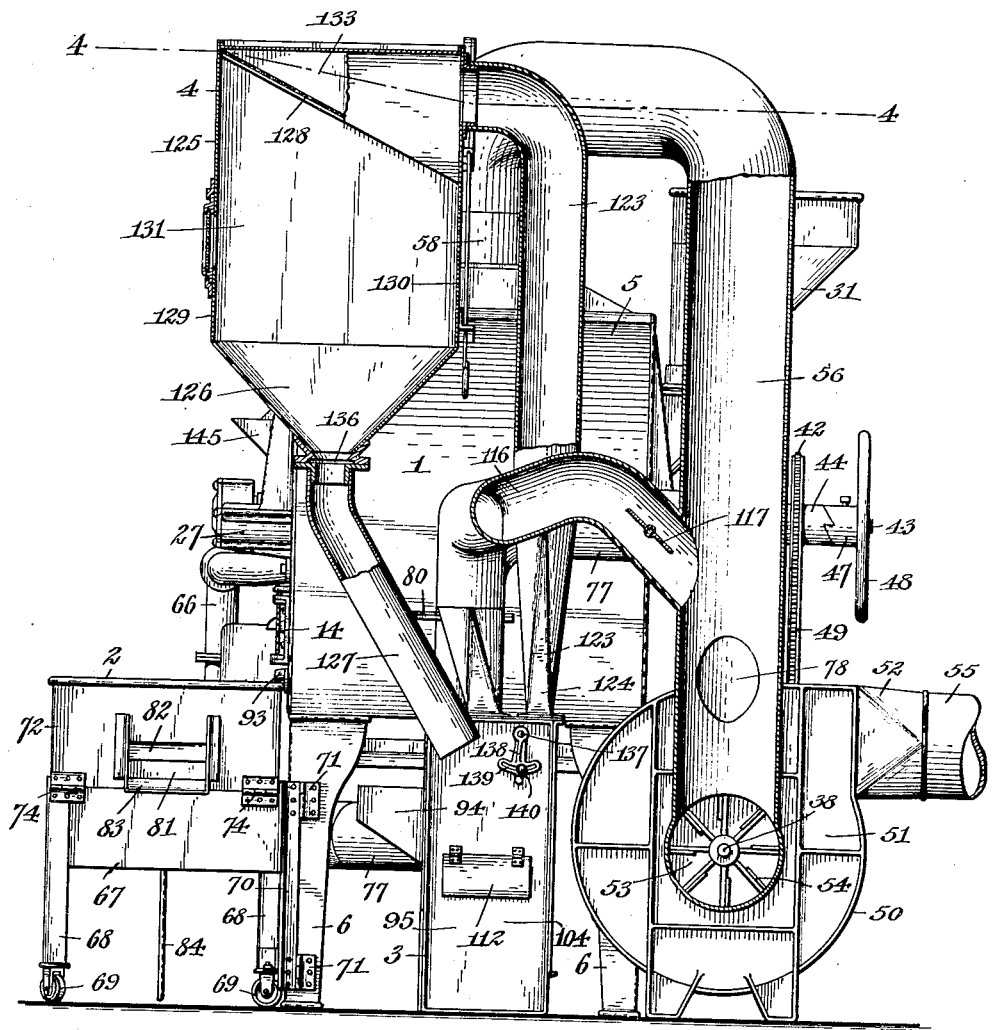

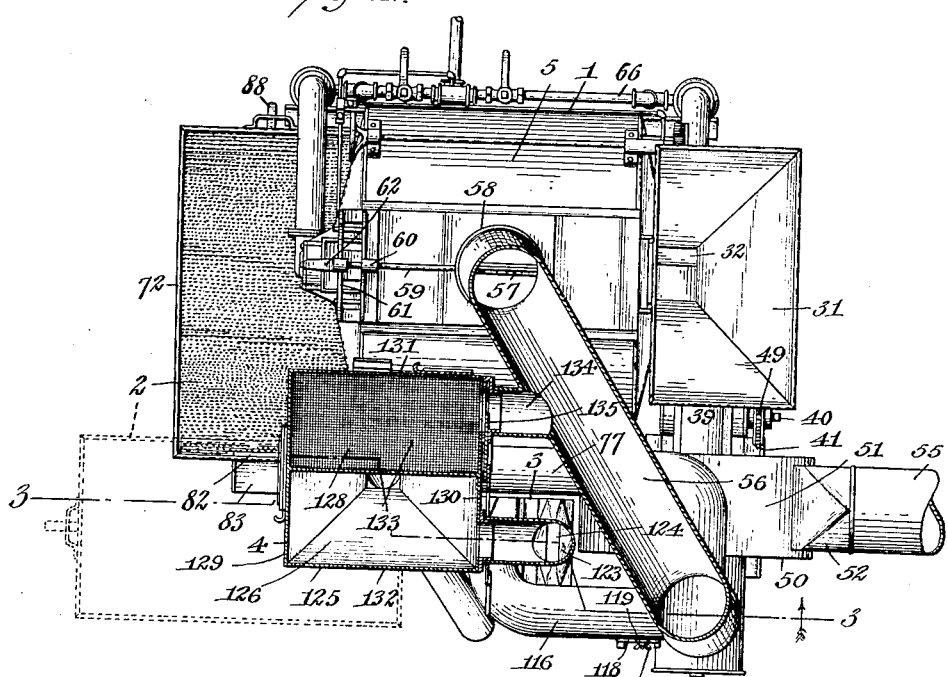

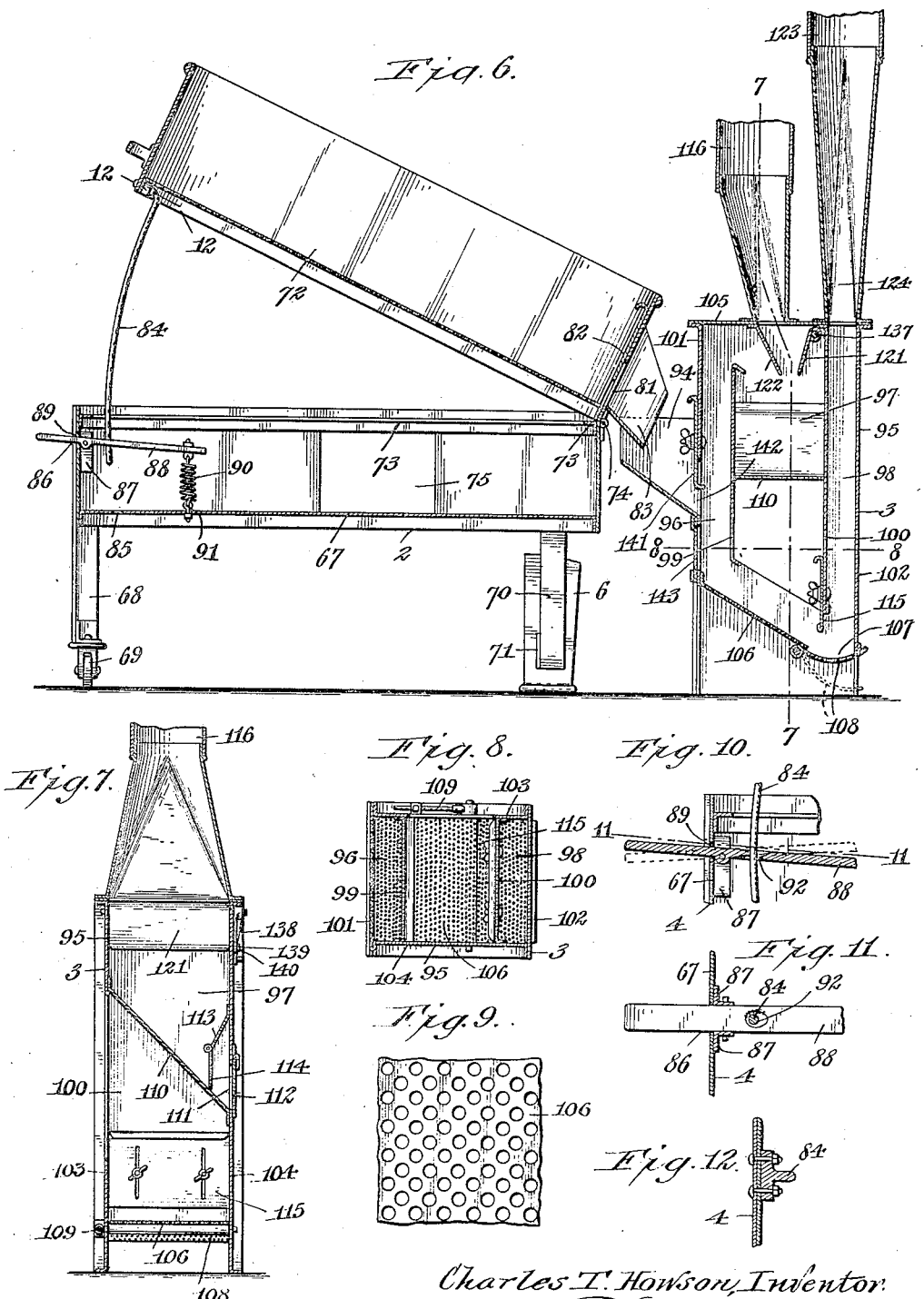

Feb. 2, 1932.　　　　C. T. HOWSON　　　　1,843,131
COFFEE ROASTING MACHINE
Filed Dec. 14, 1928　　　6 Sheets-Sheet 6

Charles T. Howson, — Inventor.
By Emil Neuhart
Attorney.

Witness:
J. J. Oberst.

Patented Feb. 2, 1932

1,843,131

UNITED STATES PATENT OFFICE

CHARLES T. HOWSON, OF SILVER CREEK, NEW YORK

COFFEE ROASTING MACHINE

Application filed December 14, 1928. Serial No. 326,071.

My invention relates to coffee roasting machines, and one of the primary objects is to provide a self-contained machine in which the coffee beans are roasted, cooled and stoned under a continuous operation and without transferring the coffee from one floor of a building to another.

Another object of my invention is the provision of a coffee roasting machine, which is self-contained and capable of being placed within a store or other showroom so that the purchasers of coffee will be able to see the complete operation of roasting and if desired, receive the coffee directly from the machine.

A further object of my invention is to provide novel means for cooling the coffee after being roasted; also novel means for separating the chaff and trash from the coffee, all under a continuous operation, or under successive steps with any desired intervals between operation.

A further object of my invention is the provision of means for cooling roasted coffee without the necessity of delivering the coffee to a floor above or beneath, as commonly practiced.

A still further object of my invention is to provide means to prevent the loss of coffee when transferring the same from the roasting element of the machine to the cooling element thereof.

A still further object of my invention is the provision of new and novel cooling means, aspirating means and stoning means, all combined so as to make a self-contained coffee roasting machine wherein all the requirements for converting green coffee beans into roasted coffee beans in cooled and marketable condition, are included.

The invention consists in the new and novel features of construction, and in the combination and arrangement of parts to be hereinafter described and more particularly pointed out in the subjoined claims.

In the drawings:—

Fig. 3 is a vertical section taken on or about line 3—3, Fig. 4, looking in the direction of the arrow crossing said line.

Fig. 4 is a horizontal section taken on or about line 4—4, Fig. 3.

Fig. 5 is a broken section taken on or about line 5—5, Fig. 1.

Fig. 6 is an enlarged vertical section through the combined aspirating and stoning element and the cooling element of the machine in their co-acting relation; the section being taken on line 6—6, Fig. 5.

Fig. 7 is a transverse section taken on line 7—7, Fig. 6.

Fig. 8 is a horizontal section taken on line 8—8, Fig. 6.

Fig. 9 is a view of a portion of the bottom wall of the combined aspirating and stoning element.

Fig. 10 is a vertical section through a portion of the cooling element showing the locking device, in detail, for locking the cooling pan in any desired position.

Fig. 11 is a horizontal section taken on line 11—11, Fig. 10.

Fig. 12 is a section taken on line 12—12, Fig. 6.

Fig. 14 is an enlarged vertical section taken on line 14—14, Fig. 1.

Fig. 15 is a vertical section taken on line 15—15, Fig. 2.

Figure 1:
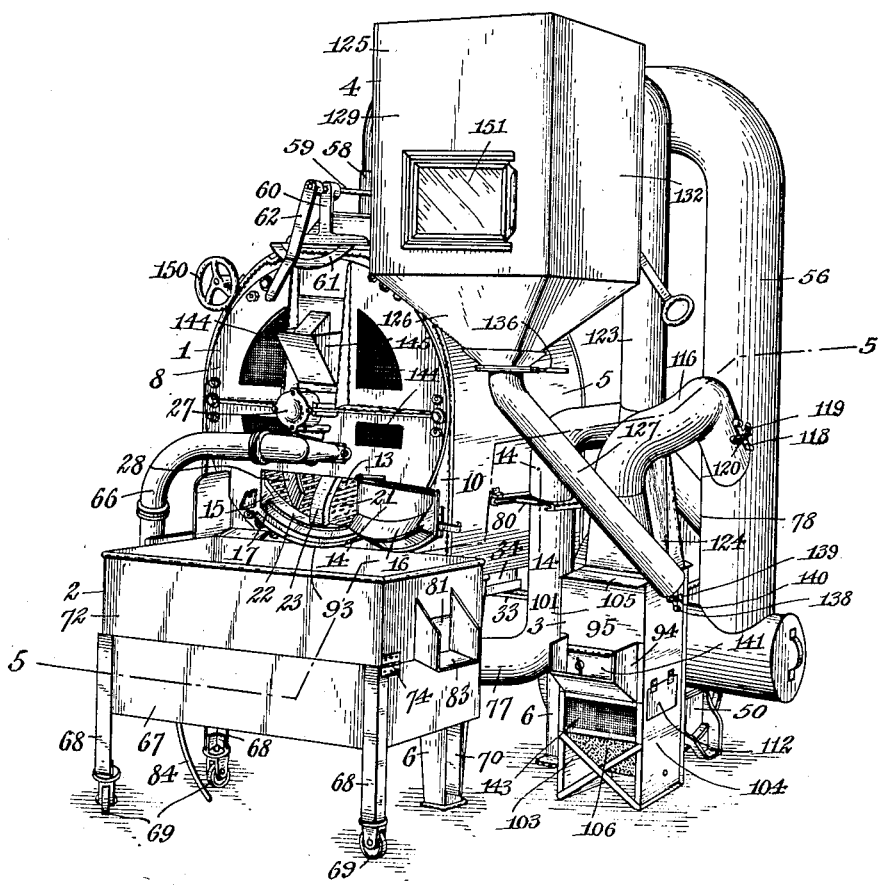
Fig. 1 is a perspective view of my improved self-contained coffee roasting machine.
Figure 13:
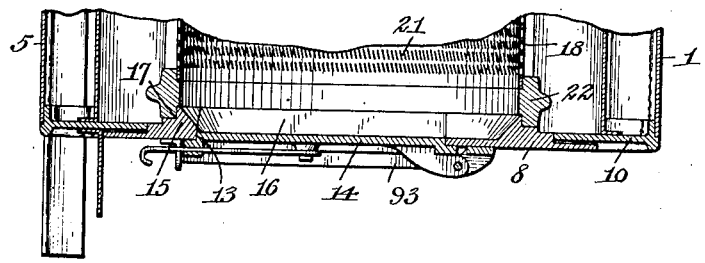
Fig. 13 is a longitudinal section through the front end of the roasting element showing the discharge door of said element closed.
Figure 2:
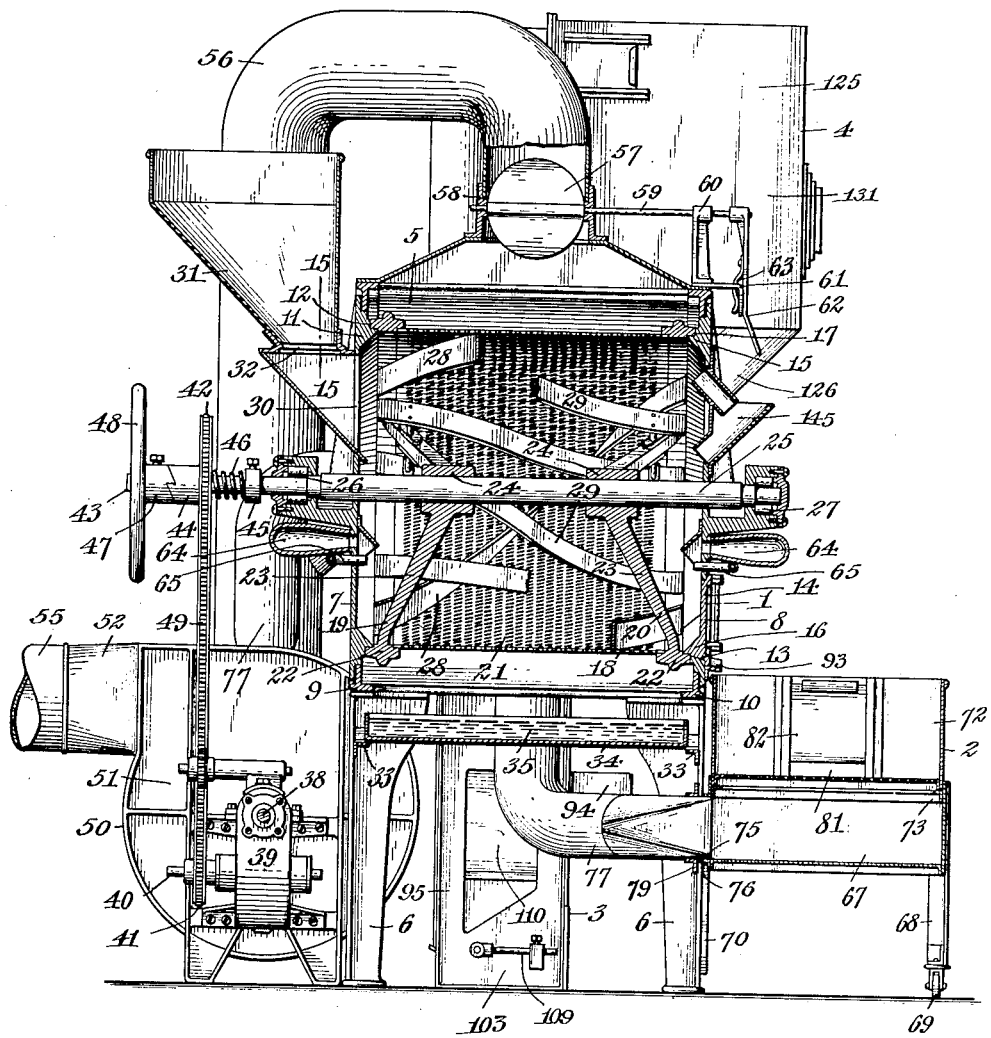
Fig. 2 is a longitudinal section taken centrally through the roasting chamber and looking toward the right in Fig. 1.

Referring now to the drawings in detail, the reference numeral 1 indicates the roasting element, 2 the cooling element, 3 the combined aspirating and stoning element, and 4 the secondary aspirating element of the machine, all combined to serve as a self-contained machine and operating to produce a unitary result; viz: that of converting green coffee beans into roasted coffee beans, cooled and freed of chaff, trash and other foreign matter. The various elements or parts of the machine are mounted on a level floor or other foundation so as to eliminate the cutting of holes through floors and dispensing with elevators and other transporting mechanism generally employed in coffee roasting apparatus now in use; thus providing a machine which may be placed in retail stores where coffee is being sold, or in other small quarters, without the necessity of occupying or utilizing more than one floor of a building.

The roasting element 1 comprises a housing or casing 5 mounted upon suitable legs 6 arranged at the four corners of the housing or casing and serving to hold the latter in an elevated position so that parts of the machine may extend underneath the same. This housing or casing is of substantially inverted U-formation in cross section so that the bottom thereof is open. The sides and top of the casing consequently form a continuous wall, the sides gradually merging into the top. The ends of the housing or casing are closed with substantial castings 7, 8 at the rear or feeding end and the front or discharge end, respectively. These castings are preferably termed end walls and they are fitted into frame members 9, 10 fastened to the ends of the side and top walls of the casing and supported by the legs 6. The rear end wall 7 has an annular flange 11 extending inwardly therefrom, the inner side of which is flared inwardly, and this flange is provided with a stepped portion 12.

The front end wall 8 has a discharge opening 13 formed therein at its lower portion, which is closed by a door 14 and this front wall and the door, which forms part of said front wall, has an annular flange 15 extending inwardly therefrom, the flange being continued along the lower edge of the door, as at 16. This flange, like the annular flange on the rear wall, is stepped as shown at 17.

18 designates the roasting reel or cylinder, which comprises two spider-like members 19, 20, and a perforated cylindrical member 21. Each of said spider-like members comprises an annulus 22, inwardly-directed arms 23, and hubs 24 fastened in any approved manner to a shaft 25 extending lengthwise through the casing and through openings formed in the end walls and journaled in bearings 26, 27, respectively, extending outwardly from said end walls. The perforated cylindrical member 21, which is preferably constructed of sheet metal, has its opposite ends fitted into the annuli 22 of the spiders 19, 20, and secured thereto in any approved manner. The annuli fit over the stepped portions 12 and 17 on the annular flanges of the end walls, and thus a tight riding fit is provided which will prevent the escape of coffee, chaff or other particles at these points.

By reason of the flaring or beveling of the inner surfaces of the annular flanges 11 and 15 on the end walls of the roasting element, the coffee is kept away from the joints between said end walls and the ends of the reels, as these flaring or beveled surfaces tend to carry the coffee beans inwardly toward the longitudinal center of the reel or cylinder.

As is common in coffee roasting machines, discharge flights 28 are secured to the inner surface of the roasting reel or cylinder by means of the usual clips, or otherwise, and fastened to the arms 23 of the spiders are return flights 29. In the rear end wall 7 of the casing, a feeding opening 30 is provided into which the lower end of a feed hopper 31 is entered, said hopper being suitably supported. Into this hopper, green coffee to be roasted is charged. Said hopper has a control or shut-off gate 32 slidable between its upper and lower ends to control the feeding of the green coffee, or to shut off the supply of coffee to the roasting reel or cylinder.

The bottom of the housing or casing 5 is open, and the opening so formed extends from front to rear and substantially from side to side, as determined by the legs 6 of the machine. Connecting opposite legs, are transversely-disposed supporting bars 33 on which is supported a chaff-pan 34 having water therein, as indicated at 35, said pan being removable from the front of the machine. The supporting bars are at an elevation to position the chaff pan in close proximity to the open bottom of the casing; and as will be hereinafter described, the roasting reel or cylinder is rotated so that chaff from this reel or cylinder drops through the perforations therein during the roasting operation, and is delivered into this chaff pan.

Mounted on a suitable support 36, positioned on the floor, or otherwise in rear of the machine, is a motor 37, the shaft 38 of which is transversely-disposed and passes through a suitable gear reduction box 39 wherein it has a gear element secured thereto, or formed thereon, meshing in the usual way with reduction gears; and from this box, a shaft 40 extends, which revolves at a reduced speed, due to the intermeshing gear elements within said gear reduction box between the shaft 38 and said shaft 40. On the projecting end of the shaft 40 a sprocket wheel 41 is secured, which is vertically alined with a sprocket wheel 42 loosely mounted on the rearwardly-projecting end 43 of the reel or cylinder shaft 25 and having a ratchet boss 44 extending rearwardly therefrom. On said shaft 25, between the sprocket wheel 42 and the rear bearing 26, a collar 45 is secured by means of a set screw or otherwise, said collar being spaced a distance from the sprocket wheel 42. Surrounding the shaft 25 between said sprocket wheel 42 and the collar 45 is a coil spring 46 which bears at one end against said collar and at its other end against said sprocket wheel and serves to exert its force against said sprocket wheel and move the same rearwardly, and when so moved, retain the same in its rearmost position, determined by the ratchet hub 47 formed on a hand wheel 48 fastened to the rear extremity of the shaft 25 by means of a set screw passing through said last-mentioned hub, or in any other approved manner. The ratchet hubs of the sprocket wheel 42 and hand wheel 48 serve as a clutch, and in conjunction with the spring 46, may be termed a spring-retained clutch.

Trained over the sprocket wheels 41 on the projecting end of the shaft 40 extending from the gear reduction box 39 and the sprocket wheel 42 on the reel or cylinder shaft 25, is a sprocket chain 49. Thus, the motor is utilized to rotate the roasting reel or cylinder at a considerably reduced speed, due to the intervention of gear reduction mechanism between the two, and also due to the fact that the sprocket wheel 41, which may be said to be of the reduction gear box, is of smaller diameter than the sprocket wheel 42 on the reel or cylinder shaft 25.

Positioned on the floor in transverse alinement with the motor 37 and the gear reduction box 39, is an exhaust fan 50 having a casing 51 provided with a tangential exhaust or outlet 52 and an inlet 53 at one side thereof, which may be considered an eye of the fan casing; also a fan element 54 within the casing, which is fastened to the motor shaft 38 extended through said casing. If desired, this fan may be driven at a lower speed than the motor, by utilizing parts of the gear reduction mechanism for that purpose.

To the tangential exhaust or outlet 52, a discharge outlet tube 55 is secured, which is continued to the outer air or to a suitable chaff collector. Connecting the inlet 53 of the fan casing with the top of the housing or casing 5, which may be more particularly referred to as the roaster housing or casing, is a main exhaust tube 56. This tube has a suitable regulating device to control the exhaust or suction action within said roaster casing, which is in the form of a pivoted damper plate 57 arranged within a fitting 58 secured to the top of the roaster casing, and having the upper end of the main exhaust tube 56 fitted thereinto. Said damper plate 57 is secured to a rotatable damper rod 59 which is passed through and journaled for rotatable adjustment in the fitting 58. This rod extends forwardly over the top of the roaster casing 5 and is also journaled in a bracket 60 rising from the roaster casing at the front end thereof. The bracket 60 rests upon a segment member 61; said bracket and segment member being fastened to the top of the roaster casing by fastening means common to both, or in any other desired manner. The segment portion of the segment member 61 is positioned in front of the roaster casing, and adapted for movement along the same is a hand lever 62, which is secured to the extremity of the rod 59. This lever bears against the front surface of said segment portion and has a spring 63 secured to its rear side which extends downwardly therefrom and has its terminal pressed against the rear surface of said segment portion, thus retaining the hand lever 62 in any position it may be moved to; and if desired, the segment portion may have graduations along its length to indicate the exact position of the damper plate 57 within the exhaust tube 56.

When the exhaust fan is rotated by the motor 37, suction is created within the roaster casing through the medium of the main exhaust tube 56 and draws the smoke and lighter chaff out of the roasting reel or cylinder and from the space surrounding said reel or cylinder, conveying it through the discharge or outlet tube 55, which may also be termed the chaff delivery tube. During the roasting operation, the heavier portions of the chaff will drop through the perforations in the roasting reel or cylinder and be delivered into the chaff pan 34, while the lighter chaff, acted upon by the suction created within the roaster casing, will be drawn around the roaster reel or cylinder and into the suction tube 56 connected to the top of said casing.

Gas is supplied to the roasting reel or cylinder by the burners 64 arranged at opposite ends of the roaster casing, and suitable pilot burners 65 are disposed underneath the burners in the usual way; for example, through the medium of a valve-controlled pipe system 66, as best shown in Fig. 4.

Coffee poured into the feeding hopper 31 is delivered into the roasting reel or cylinder 18, the cylindrical wall of which is perforated, and as this reel or cylinder is secured to the annuli 22, and said annuli have a running fit with opposite end walls or heads of the roaster casing, leakage of coffee at the end of the roaster reel or cylinder is prevented. The discharge flights 28 carry the coffee beans forward within the cylinder casing, and also upwardly with a view of causing them to drop by gravity to the bottom of the roaster reel or cylinder while being carried forwardly, the said discharge flights moving the beans forwardly towards and against the front end wall of the roaster casing, while the return flights 29 carry them rearwardly against the rear end wall of said casing; each set of flights causing reverse movements of the coffee beans from those caused by the other set. During such movements of the coffee beans, they are subjected to the action of the gas flames projected into the reel or cylinder from the gas burners 64.

In the event that the door 14 is opened, the coffee will, within a short period of time, be discharged through the door opening by the discharge flights 28, and when opening the door, any coffee that may be in contact with the inner side thereof, will be directed back into the reel or cylinder and be prevented from dropping out of the roaster casing by the flanged continuation 16 at the lower edge of the door, as will be more particularly described with reference to the cooling element of this improved machine, into which the coffee is to be discharged.

I have provided a cooling element for the coffee, so disposed with reference to the discharge opening 13 of the roaster casing that it may be swung into receiving relation to said discharge opening and then be moved away from said opening to discharge the cooled coffee without delivering it to higher planes, and especially to a higher floor, or without delivering it to a lower floor; and more especially, to so arrange the cooling element that it will not only receive the roasted coffee on the same floor level, but will discharge the coffee therefrom on the same floor level into a combined aspirating and stoning element, which may be more generically referred to as a cleaner element.

In one form of my invention this cooling element is pivotally attached to the coffee roasting element, preferably through a connection permitting horizontal movement of the cooling element towards and from the discharge end of the roaster casing. The cooling element comprises a car-like device having a pan 67 of rectangular formation, with three depending legs 68 at three of the corners of said pan. To the lower end of said legs, swivel rollers 69 are secured. An angle bar 70 is secured to the remaining or fourth corner of said pan and has one of its two webs or flanges extending outwardly therefrom. This angle bar extends from the upper end of the pan 67 to a point near the floor. Pin hinges 71 are secured to the outwardly-extending flange of said angle bar at its upper and lower ends and also to one of the front legs 6 of the roaster casing 5. Mounted on this pan 67 is a cooler pan 72 which corresponds in formation to that of the car or supporting pan 67, which latter may, more particularly, be termed a suction pan or chamber, for reasons to appear hereinafter. The cooler pan 72 is of slightly smaller dimensions than the suction pan 67, and has its lower end fitted into the latter and resting against flanges 73 fastened to the inner sides of the side and end walls of said suction pan near their upper ends. The cooler pan 72 is pivotally attached to the hinged end of the suction pan so that it may be swung upwardly into an inclined or discharging position, as illustrated in Fig. 6, the pivoted connection between the suction pan and the cooler pan being indicated at 74. Broadly considered, the suction pan 67 and its supporting legs serve as a support for the cooler pan. When the cooler pan is swung upwardly, as indicated in Fig. 6, the pan 67 loses its characteristics as a suction pan, and this also occurs when the entire cooling device is swung out of receiving position.

That side wall of the suction pan 67 which is brought into close proximity with the roasting element of my invention when the cooling element is moved into coffee-receiving position, is provided with an opening 75 having an outwardly-extending flange 76 around it. This flange is secured to the outer surface of said side wall and forms a receiving flange to receive the correspondingly shaped terminals of an auxiliary or cooler exhaust pipe or suction tube 77, which extends underneath the chaff pan 34 and is directed laterally to one side of the roaster casing, thence upwardly along said roaster casing in any suitable manner to the main suction tube 56, where connection is made therewith, as at 78.

The end of the auxiliary or cooler suction tube 77 adapted for connection with the suction pan of the cooling element, is held in position by cross bars 79 fastened to the front legs 6 of the machine. At a suitable place between its ends, this suction tube 77 is provided with a damper 80 so as to shut off the suction when the cooling element is swung away from the front end of the roaster casing, or in other words, when swung from the position shown in full lines in Figs. 4 and 5 to that shown in dotted lines, or into any intermediate position.

The front end or terminal of the auxiliary or cooler suction tube 77 is so positioned and maintained by the cross bars 79 that when swinging the cooling element or coffee cooler into coffee-receiving position, the flange 76 around the opening 75 of the suction pan 67, fits snugly over the end of said tube, which extends forwardly a suitable distance from the cross bars 79.

The cooler pan is open at the top and has a perforated bottom, such for instance as shown in detail in Fig. 9. At the hinged end of the cooler pan 72, an opening 81 is formed in the end wall thereof, which has, in co-operation therewith, a slide gate or damper 82 adapted to open said opening to any desired extent, or to entirely close the same; and fastened to the outer side of said end wall is a discharge chute 83, the bottom of which is inclined. At the opposite end of the cooler pan, a lock rod 84 is provided, said rod being curved and having as its center, or substantially so, the pivot or hinge 74 of the cooler pan. This lock rod is of considerable length and when the cooler pan is lowered, extends through an opening 85 in the bottom of the suction pan 67.

To the end of the suction pan 67, opposite the pivot hinge 74, a retainer or lock device 86 is provided. This retainer or lock device comprises a suitable support in the form of two brackets 87 between which a retainer or lock lever 88 is positioned, said lever being pivotally fastened to said brackets between its ends and extending outwardly through an opening 89 in the end wall of said suction pan and also inwardly a distance into said pan. At the inner end of said lever, one end of a retractile spring 90 is secured, the other end thereof being fastened to the bottom of the suction pan, as at 91. This lever has an opening 92 formed therein a short distance from its pivotal point through which the lock rod 84 is passed, and this opening preferably has a friction-ratchet wall to bite into or grip the rod and assure a more effective retention of the rod when the cooling pan is elevated into discharging position. The tendency of the retractile spring 90 is to cause the wall of said opening to bind or bite firmly against the lock rod, and thus prevent the cooler pan from changing its position until the force of the spring is counteracted, which is effected by depressing the outer projecting end of the lever 88 so that the lock rod 84 is given free movement through the retaining lever 88. It is essential that the lock rod be rigidly secured to the cooler pan and that it has a fixed position on said pan, as clearly shown in Fig. 12.

As stated, the cooling element is swung in an arc of a circle from the position shown in dotted lines in Fig. 5 to that shown in full lines, or reversely, and in order to discharge the roasted coffee from the roasting reel or cylinder into the cooler pan 72, it is necessary to swing said cooling element against the front end of the roasting element so as to bring the cooler suction tube 77 into operative position with respect to the suction pan 67. Upon opening the door 14 of the roaster casing 5, the roasted coffee is delivered into said cooler pan, and in order to guard against any portion of this coffee dropping onto the floor between the cooling element and the roasting element, a segmental retainer lip or flange 93 is fastened to the outer side of the roaster casing underneath the door opening, which lip or flange overhangs the inner side wall of the cooler pan when in receiving position, as best shown in Fig. 1.

With the cooling element positioned as shown in Fig. 1, and the cooler suction tube 77 in connection with the suction pan 67 of said cooling element, it is necessary to open the damper 80 in said suction tube, and with the suction fan in operation, suction is created in the suction pan 67, which acts upon the coffee within the cooler pan, and draws all smoke and any light material that may be contained within the coffee into said suction pan and out through the suction tube 77, to be discharged by the fan through the outlet tube 55. Cool air is also drawn downwardly through the coffee and the coffee thus cooled.

When the coffee is properly cooled, the damper 80 in the suction tube 77 is closed and the cooling element then swung on its hinges 71, which causes disconnection of the suction pan from the suction tube 77. In swinging the cooling element through an arc of a circle of 90 degrees, or from the position shown in full lines in Figs. 4 and 5 to that shown in dotted lines, the cooling element is in position for discharging the cooled coffee therein into the combined aspirator and stoner 3, which has a receiving hopper 94 over which the discharge chute 83 of the cooler pan is to be positioned. When the cooling element is in discharging position, the cooler pan 72 is swung upwardly on its hinge or pivot 74 into the inclined position shown in Fig. 6, thus inclining the cooler pan and causing the locking bar 84 to be drawn upwardly through the opening 92 in the retainer lever 88, preferably after depressing the outer projecting end of said lever, which causes the inner portion of said lever to swing upwardly against the action of the retractile spring 90 and releases the lock bar so that it may be readily moved through the opening 92 in said lever. Upon releasing the retainer lever, the retractile spring 90 is brought into action and the wall of the opening 92 in said lever firmly grips or bites into the lock bar, thus holding the cooling pan in elevated or inclined position, with the result that the cooled coffee moves downwardly toward the lower end of said pan. Upon opening the slide gate 82 of said pan, the coffee is delivered into the hopper 94 of the combined aspirator and stoner.

The combined aspirator and stoner 3 consists of a casing 95 divided into an aspirating leg 96, a separating chamber 97, and a stoning leg 98 by two vertically-trending walls 99, 100, disposed transversely, the wall 99 separating the aspirating leg from the separating chamber and the wall 100 the stoning leg from said separating chamber.

The casing 95 comprises a front wall 101 to which the receiving hopper 94 is secured, a rear wall 102, side walls 103, 104, a top wall 105, and a perforated inclined bottom wall 106 inclined downwardly from the front wall toward the rear wall and providing a discharge opening 107 between said rear wall and the rear end of said perforated inclined wall, said opening being closed by a perforated gate 108 pivotally secured to the rear or lower end of said inclined wall 106, and serving as a part of said inclined bottom wall, the pivot of said gate extending through opposite side walls and one end thereof having a weighted lever 109 tending to keep said gate in closed position.

The vertically-trending wall 99 within the casing 95 terminates at its lower end in spaced relation to the perforated inclined bottom wall 106 and at its upper end in spaced relation to the top wall 105 of said casing. The aspirating leg is therefore in communication with the lower end of the casing and also with the upper end of the separating chamber 97. This separating chamber has an inclined bottom wall 110 which is inclined from one side wall to the other and spaced from the inclined bottom wall 106 of the casing. The side wall toward which said wall 110 is inclined has a discharge opening 111, which may be said to be at the lower end of said separating chamber, and this discharge opening is closed by a pivoted gate 112 normally held in closed position by gravity. Extending inwardly from said last-mentioned side wall is a deflector wall 113, which is spaced from the transversely-inclined bottom wall of the separating chamber, and the space thus provided is closed by a pivoted gate 114 which normally assumes a substantially vertical position and has its outer or free end in contact with said bottom wall 110; said gate 114 being spaced from the discharge opening 111.

The vertically-trending transversely-disposed wall 100 which separates the stoning leg 98 from the separating chamber 97, terminates at its lower end in spaced relation to the perforated gate 108, and vertically adjustable on the lower end of said wall 100 is a gate 115, which is adjustable upwardly or downwardly to provide any desired space between the lower end thereof and the perforated gate 108.

The upper end of the separating chamber 97 is connected with the main exhaust tube 56 by means of a suction tube 116, which has a damper or gate 117 arranged therein, the pivot of which extends outwardly and has an operating handle 118 for adjusting the same. This handle is provided with a slotted segment 119 through which a bolt is passed and on which bolt a wing nut 120 is threaded to fasten the handle to any adjusted position and consequently the damper or gate 117, in accordance with the suction found most desirable to establish within the separating chamber of the combined aspirator and stoner.

The suction created within the upper end of the separating chamber 97 is further regulated by a valve or gate 121 situated in the upper end of said chamber, and this valve or gate is adjusted with respect to the inlet of the suction tube 116 by means of a handle on the outer side of the casing, corresponding to the handle 118.

A baffle plate 122 is used in connection with the damper or gate 121. This baffle plate depends from the top wall 105 of the casing and is spaced from the upper end of the wall 99 separating the aspirating leg from the separating chamber. The lower end of said baffle plate co-operates with the lower or free end of the valve or gate 121, and the space between these two determines the amount of suction created at this point and also between the baffle plate and the upper end of the dividing wall 99.

The upper end of the stoning leg 98 is connected with the secondary element 4 of the machine by a suction tube 123, the lower end of which is gradually restricted, as indicated at 124, Fig. 6.

The secondary aspirating element comprises a casing 125, whose upper portion is of rectangular formation, and its lower portion tapered into hopper formation, as shown at 126, the lower end of this hopper formation being connected with a discharge tube 127 extending downwardly therefrom. In the upper portion of this casing 125, a screen or other foraminous wall 128 is arranged, it being inclined from one wall to an opposite wall, preferably from the front wall 129 of the casing to the rear wall 130 and having a lateral dimension approximately one-half the distance between the two side walls 131, 132; thus forming a substantially triangular chamber 133.

The suction tube 123 opens into the casing 125 outside of the triangular chamber 133, and the latter is connected with the main suction tube 56 by a connecting suction tube 134 so that suction is created within the triangular chamber 133 of the casing 125, through the openings in the wall 128 and the suction tube 123. The means for regulating the suction in these parts of the machine comprises a damper 135 slidable in the suction tube 134 at the point of its connection to the casing 125. A slide gate 136 is also provided at the point of connection of the hopper-like lower portion of the casing 125 and the discharge tube 127.

The damper or gate 121 at the upper end of the separating chamber 97 of the combined aspirator and stoner is fastened to a pivot rod 137 which extends through the side wall 104 of the combined aspirator and stoner and has a handle 138 secured thereto, which is provided with a slotted segment 139 through which a screw bolt 140 is passed, which is threaded into said side wall and which, when tightened, holds the handle 138 in any adjusted position; it being, of course, understood that by reason of the damper or gate 121 being fastened to the pivot rod 137, said damper or gate will be adjusted accordingly.

The front wall 101 of said combined aspirator and stoner casing has a vertically-adjustable gate 141 secured thereto within the receiving hopper 94, which is adapted to be raised or lowered to restrict the receiving opening 142 in said front wall, and thus control the feeding of the coffee from the cooling element into the aspirating leg 96. The lower portion of the front wall is constructed to permit air to be drawn into the lower end of the aspirating leg 96, and for this purpose a screen 143 is provided at this point, although air is also drawn through the perforated bottom wall 106.

The castings 8 and 9 serving as end walls for the roaster casing have openings therein, for the passage of air therethrough, and these openings are closed with wire mesh or other similar material 144. Suitable means is also provided in the front end wall for testing the coffee, this being indicated at 145, Fig. 1.

The gate 32 of the feed hopper 31 is secured to a transversely-slidable rod 146 having a gear rack 147 secured thereto, with which a gear wheel 148 meshes, which is secured to a shaft 149 extending along one side of the roaster casing and terminating at the front end thereof, where it is provided with a hand wheel 150 for rotating said shaft and operating the shut-off gate 32. In this manner the supply of coffee to the roasting reel or cylinder is controlled from the front of the machine, although the feed hopper is located at the rear end thereof.

In order that the action of the coffee within the secondary aspirating casing may be readily seen, the front wall 129 of said casing is provided with a glazed sight opening 151, as best shown in Fig. 1.

When operating the machine, coffee is delivered into the feed hopper 31, and by the latter directed into the roasting reel or cylinder 18, the burners 64 having been previously ignited and the motor 37 set into action so as to rotate said roasting reel or cylinder. The coffee is lifted by the flights within the reel or cylinder and carried back and forth to assure uniform action.

Due to the mounting of the ring or annuli ends of the reel or cylinder on the stepped portions of the annular flanges 11 and 15, a circular track is provided for each end of the reel or cylinder, which prevents leakage of the coffee at such points, and by having the annular flange flared inwardly, the coffee is kept away from the joints and the coffee beans carried inwardly toward the center of the cylinder.

During the operation of roasting, chaff will escape through the openings of the reel or cylinder and be delivered into the chaff pan 34 underneath the reel or cylinder, and the suction created around the reel or cylinder by the fan 50 will carry the smoke and light particles upwardly through the roaster casing and into the main suction tube 56 and fan 50; the fan causing the smoke and light particles to be carried out through the discharge tube 55.

In the event that the electric current is shut off, or the motor fails for any reason beyond the control of the operator, the coffee, even though only partially roasted, can be discharged from the reel or cylinder to prevent burning of the same; this being accomplished by grasping the hand wheel 48 which is fastened to the shaft 25, and by rotating said hand wheel, the shaft may be operated without imparting movement to the motor or the transmission mechanism between the motor and said shaft. When so operating the hand wheel 48, the ratchet teeth on the hub 47 of said hand wheel will be caused to ride over the ratchet teeth on the boss or hub 44 of the sprocket wheel 42, which action is effected by moving the sprocket wheel 42 back and forth on the shaft against the action of the spring 46 surrounding said shaft. It is, of course, necessary that the door 14 in the front wall of the roaster casing is opened during such operation.

When the coffee is fully roasted, the door 14 is opened and any coffee that may have been forced against the door by the discharge flights 28 within the reel or cylinder will be carried back into the reel or cylinder by the flanged continuation 16 along the lower marginal portion of the door; the coffee being then directed into the cooling element 2 previously positioned in front of the machine in direct connection with the cooler exhaust tube 77.

The coffee delivered into the cooling element is subjected to the action of suction established through said exhaust tube upon opening of the damper 80. The operator spreads the coffee over the perforated bottom of the cooler pan 72 so that air is drawn through the layer of coffee so provided on said bottom, with the result that the heat and smoke of the coffee is drawn through the pan or suction chamber 67. When the coffee is properly cooled, the cooling element is swung on its pivot or hinge connection 71 into discharging position with the discharge chute 83 in feeding relation to the receiving hopper 94 of the combined aspirating and stoning element, the cooling pan being inclined, as indicated in Fig. 6; after which the gate 82 is opened to deliver the coffee from said pan into the aspirator leg 96 of the combined aspirating and stoning element.

Through the medium of the various dampers and gates employed in the several suction tubes and other elements of the apparatus, air currents are established under suction that have the proper volume and velocity when such dampers or gates are under correct adjustment, and where a single suction-inducing device, such as the fan 52, is employed for creating suction in different parts of the machine, it is of advantage to introduce separate dampers or other controlling means between such parts and the suction-inducing device, as the conditions of operation vary at different points or in different parts of the machine. It is, therefore, necessary to provide regulation for each of such points or parts according to the requirements or demands. When the coffee is delivered into the aspirating leg 96 of the combined aspirator and stoner, the suction created in said leg acts to separate the hulls and trash, not discharged in the roaster casing, from the coffee beans and carry such hulls and trash upwardly into said leg, the coffee and any stones or other heavy particles dropping onto the perforated bottom 106 and being delivered by the latter onto the perforated gate 108 arranged at the lower end of said bottom.

The suction in the aspirating leg 96 is such that it will not be effective upon the coffee beans or other heavy particles, and the hulls and trash drawn upwardly in said leg will engage the baffle plate 122, and by it be deflected so as to drop onto the inclined bottom wall 110 of the separating chamber 97, the air currents created by the suction passing around the lower end of said baffle plate and out through the suction tube 116; the volume and velocity of the air currents at this point being determined by the valve or gate 117 in said tube. The hulls and trash so separated from the coffee beans move downwardly along the inclined bottom 110 and are trapped by the gate 114, and when accumulated in sufficient quantity, open said gate and move in contact with the gate 112, the weight of the hulls and trash opening said last-mentioned gate so that this waste material passes out through the discharge opening 111 and drops onto the floor, or into a suitable pan, if provided at this point.

The suction created in the stoning leg 98 is of sufficient force to act upon the coffee beans lodging on the pivoted perforated gate 108 and the stones and other particles heavier than the coffee beans remain to be discharged from the combined aspirator and stoner at this point, the suction being ineffective on the stones which remain lodged upon the pivoted gate 108 to be discharged from the combined aspirator and stoner upon opening said gate.

With a view of reducing the suction between the lower end of the stoning leg 98 and the feeding opening in the aspirating leg 96, the gate 115 is adjusted to the desired position. The coffee drawn through the stoning leg 98 passes upwardly through the tube 123 and is delivered into the casing 125 of the secondary aspirating element 4, the air currents passing through the openings in the inclined wall 128 and being drawn through the tubes 134 and 56 and into the fan element 50, from which it is exhausted through the discharge tube 55; any particles that might have become freed from the coffee beans being drawn outwardly while the coffee beans drop to the bottom of the casing 125, and upon opening the damper or gate 136 are discharged out through the discharge tube 127.

In the modification shown in Figs. 16 to 19, the cooling element 2 is positioned in substantially the same location as that illustrated in the preferred construction, and is swiveled or pivoted on a stationary tube or chamber 152 having unbroken, although controllable, connection at all times with the suction fan 50. In this modification, a suction chamber 153 is provided within said tube, which tube is mounted on the floor underneath one corner of the suction pan 67, and this suction chamber has connection with the main suction tube 54 through the medium of a suction tube 154 which serves the same purpose as the suction tube 77 in the preferred construction hereinafter described.

It may here be stated that the pivotal point of the cooling element in this modification, as well as in the preferred construction, is described as being at one of the corners of such element, and by this is meant that the pivotal point is located within the area of one of the four quarters of the cooling element, viewing the same from the top, so that when swinging this cooling element on its pivot it will be moved from the roasting element to the combined aspirating and stoning element, or reversely, and the term "corner" as employed in this specification and in the claims is to be constructed accordingly.

The swiveled or pivoted connection of the cooling element to the stationary tube or chamber 152 is created in this modification through the medium of a depending flange 155 on the bottom of the suction pan 67, and an upstanding flange 156 at the upper end of the suction chamber 153; said flange 156 surrounding the depending flange 155 and having a moving fit therewith, although sufficiently tight to prevent the escape of air at this connection.

In the upstanding flange 156 a plate 157 is provided which has openings 158 therein, preferably two in number arranged at diametrically opposite points. In the depending flange a similar plate 159 is arranged, which has openings 160 therein of a size corresponding to those in the plate 154, but being disposed on quarters so that when the cooling element is moved in front of the roasting machine to receive the coffee therefrom, the openings 160 in the plate 159 are brought into registration with two diametrically opposite openings 158 in the plate 157, thus placing the suction pan under suction. By this means the coffee delivered into the cooling pan of the cooling element is subjected to the action of the suction within the suction pan and cool air is drawn through the coffee within the cooling pan. When moving the cooling element from the position shown in full lines in Fig. 16 to that shown in dotted lines, the two openings 160 are closed by the plate 157 underneath and remain closed until the cooling element closely approaches the end of its movement, indicated by dotted lines in Fig. 16, at which point the openings 160 in the plate 159 are brought into registration with the remaining openings in the plate 157, so that the cooling element may be moved into discharging position and be subjected to the action of suction when in such position. At any point between the two extremes of the range of movement of the cooling element, suction will be automatically cut off by the damper device, which the apertured plates 157 and 159 comprise. A damper, of course, will be provided in the suction tube 154 which may be opened and closed at will; this being for the same purpose as the damper in the suction tube 77 shown in the preferred construction.

Figure 16:
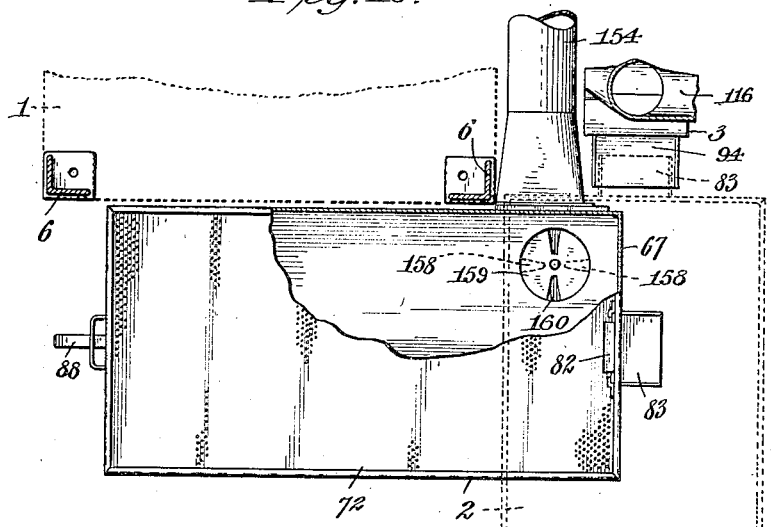
Fig. 16 is a sectional plan view of a modified form of cooling element shown in connection with adjacent parts of the machine.
Figure 19:
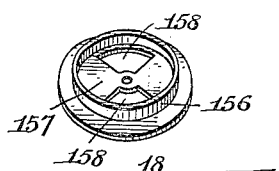
Fig. 19 is a detached perspective view of one of the swivel members whereby communication between the suction pan of the cooling element and the suction chamber of the suction tube connected therewith is established, said member having its openings enlarged over the openings shown in Fig. 16.
Figure 17:
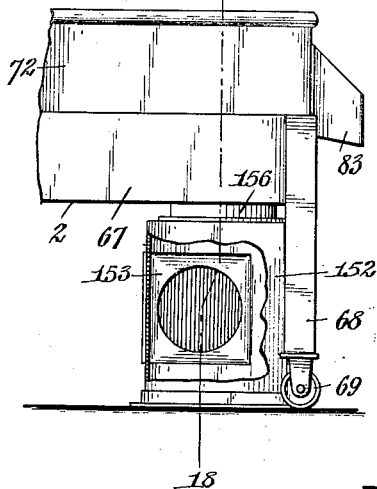
Fig. 17 is a side elevation of one end of the cooling element shown in Fig. 16, a portion of the suction tube or chamber connected therewith being broken away.
Figure 18:
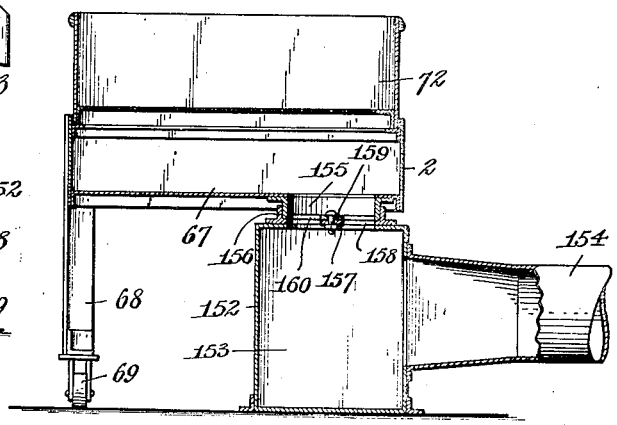
Fig. 18 is a cross section taken on line 18—18, Fig. 17.

Under the arrangement shown in Fig. 19, the cooling element will be placed under the action of suction when in the position shown in full lines in Fig. 16, and will remain under such action but under gradual restriction during approximately one-half of the range of movement of said cooling element from the position shown in full lines in Fig. 16 to that shown in dotted lines. Therefore, when the cooling element is in discharging position, the suction on the suction pan of the cooling element will be automatically shut off. The arrangement of opening in the plates 157, 159 may be varied, as may be found necessary or desirable.

The depending flange 155 and the apertured plate therein may be termed a swivel connector, and a like term may be given the upstanding flange 156 and the apertured plate therein, the first-mentioned plate serving as a damper to open or close the openings in the plate 157 beneath the same, depending on the position of the cooling element. If desired the damper device in the swivel connection between the suction pan 67 and the suction chamber 153 may be dispensed with and the suction controlled entirely by the damper within the suction tube 154.

Having thus described my invention, what I claim is:—

1. In a coffee roasting machine, a roasting element, an aspirating element, and a cooling element adapted to travel in a definite path between said roasting element and said aspirating elements so as to receive the coffee from said roasting element and discharge the same into said aspirating element, said cooling element being automatically positioned to discharge into said aspirating element at the end of its movement away from said roasting element, 2. In a coffee roasting machine, the combination of a roasting element, an aspirating element, and a cooling element movable in and confined to a definite path between said roasting element and said aspirating element, all of said elements being mounted on the same floor level and said cooling element being positioned to discharge into said aspirating element upon completion of the movement of said cooling element toward said aspirating element.

3. In a coffee roasting machine, the combination of a roasting element, an aspirating element supported on the same floor level as said roasting element, and a cooling element movable in and confined to a definite path between said roasting element and said aspirating element and movable from one to the other to receive roasted coffee from the roasting element and discharge the same in cooled condition to said aspirating element.

4. In a coffee roasting machine, the combination of a roasting element, an aspirating element, a suction inducing device, and a cooling element, said cooling element being movable through an arc of a circle for connection with said suction element and to receive the roasted coffee from said roasting element and also to deliver the cooled roasted coffee into said aspirating element.

5. A coffee roasting machine comprising a roasting element and a cooling element movable in an arc of a circle toward and from said roasting element to receive the roasted coffee from said roasting element when moved towards said roasting element and to deliver the roasted cooled coffee when swung away from said roasting element.

6. A coffee roasting machine, comprising a roasting element, a suction-inducing device, and a cooling element movable toward and from said roasting element, said cooling element when moved towards said roasting element making conduit connection with said suction-inducing device.

7. A coffee roasting machine, comprising a roasting element, a suction-inducing device, and a cooling element movable toward and from said roasting element and in conduit connection with said suction-inducing device when in coffee-receiving position, said cooling element having portions thereof relatively movable for discharging cooled roasted coffee and breaking its conduit connection when moved away from said roasting element.

8. A coffee roasting machine, comprising a roasting element, a cooling element movable towards and from said roasting element, and a suction-inducing device having conduit connection with said cooling element when in coffee-receiving position but being ineffective on said cooling element when the latter is within a predetermined range of movement away from said roasting element.

9. A coffee roasting machine, comprising a roasting element, a coffee treating element, a movable cooling element for receiving coffee from said roasting element and delivering the cooled coffee into said coffee treating element, and a suction-inducing device in communication through conduit connection with said cooling element to maintain communication with said cooling element at all times, except when said cooling element is in or traveling through the intermediate portion of its range of movement.

10. A coffee roasting machine, comprising a roasting element supported on a floor, an aspirating element also supported on said floor, a cooling element horizontally movable in an arc of a circle of approximately ninety degrees to receive roasted coffee from said roasting element when at the end of its range of movement in one direction and to deliver the coffee therefrom when at the end of its range of movement in the opposite direction, and a suction-inducing device having a conduit in connection therewith and terminating in an open end adapted for connection with said cooling element when the latter is moved into coffee-receiving position.

11. In a coffee roasting machine, a cooling element of elongated formation having a pivotal point at one corner thereof on which it is movable through an arc of a circle.

12. In a coffee roasting machine, the combination of a suction-inducing device, a cooling element bodily movable and having a suction pan and a cooling pan above said suction pan provided with openings in its bottom and being hinged on said suction pan to tilt thereon, and conduit connection between said suction-inducing device and said suction pan disconnectible when bodily moving said cooling element.

13. A cooling device for coffee roasting machines to receive roasted coffee and to deliver the same in cooled condition, comprising a structure movable in an arc of a circle and embodying a coffee-receiving pan provided with openings in its bottom, an exhaust chamber underneath said structure at one corner thereof and over which said structure swings while maintaining conduit connection with said suction chamber, and a suction-inducing device connected with said suction chamber.

14. In a coffee roasting machine, a suction-inducing device, a suction chamber in conduit connection with said suction-inducing device and having a fixed position, and a cooling element in conduit connection with said suction chamber and swinging on said chamber as a center.

15. A coffee cooling device, comprising a suction pan of rectangular formation having supporting legs at three of its corners provided with rollers at their lower ends and being pivotally supported at its fourth corner to provide a center on which said cooling element may be swung through an arc of a circle while supported by said legs, and a cooling pan mounted on said suction pan and covering the same, said cooling pan having a bottom onto which hot roasted coffee is delivered.

16. In a coffee roasting machine, a cooling element comprising a suction pan supported for a limited range of movement in opposite directions, a suction-inducing device in conduit connection with said suction pan, and a cooling pan mounted on and covering said suction pan and being hinged to one side of said suction pan to permit of inclining the same independent of said suction pan, said cooling pan having a discharge opening at its hinged side, and means at its directly opposite side for holding said cooling pan in inclined position.

17. A cooling element for coffee machines, comprising a suction pan of rectangular formation, a cooling pan closing the top of said suction pan and having a perforated bottom, said cooling pan being pivotally attached to said suction pan at one end to permit of its being inclined, and means at the other end of said cooling pan co-acting with parts on said suction pan for holding said cooling pan in inclined position, supporting legs at three corners of said suction pan, a suction chamber at the fourth corner underneath said suction pan having conduit connection with the latter through the bottom thereof, and means for shutting off the connection between said suction pan and said suction chamber when said suction pan is positioned at predetermined points in the range of its movements.

18. A cooling element for coffee roasting machines, comprising a pan having a bottom and being open at the top, a cooling pan mounted on said first-mentioned pan and closing the top thereof, a suction chamber underneath said first-mentioned pan in conduit connection with the latter through the bottom thereof and on which said pan is adapted to swing through an arc of a circle, and a damper device within the conduit connection between said pan and said suction chamber.

19. A cooling device for coffee roasting machines, comprising a suction pan pivotally mounted for swinging movement at one corner thereof and being supported by means of legs at the remaining corners thereof.

20. A cooling device for coffee roasting machines, comprising a suction pan pivotally mounted for swinging movement at one corner thereof and being supported by means of legs at the remaining corners thereof, said suction pan being adapted for conduit connection with a suction-inducing device, a cooling pan mounted on and closing the top of said suction pan and having a perforated bottom and a discharge opening at one end thereof, said cooling pan being hinged at that end thereof having the discharge opening therein, a retainer rod secured to said cooling pan at the opposite end thereof and extending downwardly through said suction pan and through an opening in the latter, a lever mounted in the end wall of said suction pan opposite the end having hinged connection with said cooling pan, said lever extending outwardly through said end wall and inwardly into the suction chamber and having an opening through which said retainer rod extends, and a spring attached at one end to the inner end of said lever and at its other end to the bottom of said suction chamber.

21. In a coffee roasting machine, the combination with a roasting element having a roaster casing and a roasting reel rotatable therein, a suction-inducing device, a suction tube between said suction-inducing device and said roaster casing, a cooling element adapted to receive roasted coffee from said roasting reel and having conduit connection with said suction tube, and an aspirating element having conduit connection with said suction tube and adapted to receive the roasted coffee when cooled from said cooling element.

22. In a coffee roasting machine, the combination with a roasting element having a roaster casing and a roasting reel rotatable therein, a suction-inducing device, a suction tube between said suction-inducing device and said roaster casing, a cooling element adapted to receive roasted coffee from said roasting reel and having conduit connection with said suction tube, a combined aspirating and stoning element having conduit connection with said suction tube and toward which said cooling element is movable for discharging cooled roasted coffee thereinto, a second aspirating element having conduit connection with said combined aspirating and stoning element and also conduit connection with said suction tube, said secondary aspirating element having a screened chamber into which said last-mentioned conduit connection opens, and movable means to support coffee in said secondary aspirating element.

23. In a coffee roasting machine, a roasting element, an aspirating element, a cooling element movable between said roasting element and said aspirating element to receive roasted coffee from said roasting element and to deliver roasted coffee to said aspirating element, a suction-inducing device, conduit connections between said suction-inducing device and each of said element, and means for independently regulating the suction in each of said elements.

24. In a coffee roasting machine, the combination of a roasting element, a suction-inducing device, and a cooling element for cooling the coffee after being delivered thereto from said roasting element, said cooling element being movable through an arc of a circle for connection with said suction inducing device when in coffee-receiving position, but otherwise being disconnected from said suction-inducing device.

In testimony whereof, I affix my signature.
CHARLES T. HOWSON.